United States Patent [19]

Waggoner

[11] 3,909,487
[45] Sept. 30, 1975

[54] DRY BLENDS OF POLYMERS AND FUMED SILICON DIOXIDE TREATED WITH AN ALIPHATIC SILANE

[75] Inventor: Marion Glen Waggoner, Parkersburg, W. Va.

[73] Assignee: E. I. Du Pont de Nemours and Company, Wilmington, Del.

[22] Filed: Nov. 28, 1973

[21] Appl. No.: 419,890

[52] U.S. Cl. .................. 260/42.15; 117/18; 117/94; 117/124 F; 260/78.5 R; 260/80.8; 260/88.1 PC
[51] Int. Cl. ............................................. C08f 45/00
[58] Field of Search ....... 260/88.1 PC, 80.8, 78.5 R, 260/42.15

[56] References Cited
UNITED STATES PATENTS
3,267,083  8/1966  Imhof................................ 260/80.5

Primary Examiner—Stanford M. Levin

[57] ABSTRACT

Dry blend coating materials which consist essentially of an ionic copolymer, or a copolymer or terpolymer base resin of the ionic copolymer and 0.1 to 0.5% by weight, based on the weight of copolymer, of a hydrophobic, aliphatic silane treated, fumed silicon dioxide. The materials are useful for coating glass bottles.

9 Claims, No Drawings

DRY BLENDS OF POLYMERS AND FUMED SILICON DIOXIDE TREATED WITH AN ALIPHATIC SILANE

BACKGROUND OF THE INVENTION

1. Field of the Invention

This invention relates to dry blend coating materials and particularly to such materials prepared from ionic copolymers or copolymers or terpolymer base resin thereof and hydrophobic, aliphatic silane treated, fumed silicon dioxide.

2. Description of the Prior Art

Ionic copolymer coatings show good adhesion to many substrates, including glass. Such ionic copolymer coatings fused on glass bottles, such as nonreturnable beverage bottles, show initial adhesion to the glass which generally exceeds the ultimate tensile strength of the coatings. Due to absorption of water by the coating upon aging it has been found that the adhesion of the coating decreases. In fact, it may take as long as three weeks or more before a level of adhesion is reached whereby the coating becomes peelable (ultimate tensile strength of the polymer exceeds the adhesion). Ionomeric copolymers are notch sensitive materials. Therefore, cracks in the glass, when broken, propagate into the coating, greatly decreasing the fragment retaining ability of the plastic coating which is referred to as cullet retention. It is desirable to achieve maximum cullet retention of the glass in a period of 24 to 48 hours or less.

SUMMARY OF THE INVENTION

It has now been found that coatings which achieve maximum cullet retention in 24 to 48 hours or less are achieved by using a dry blend coating material which consists essentially of a copolymer of $\alpha$-olefins of the formula $R-CH=CH_2$, where R is a radical selected from the class consisting of hydrogen and alkyl radicals having from 1 to 8 carbon atoms, and $\alpha,\beta$-ethylenically unsaturated carboxylic acids having from 3 to 8 carbon atoms, said copolymers having from 0 to 90% of the carboxylic acid groups ionized by neutralization with metal ions, said copolymer being a direct copolymer of the $\alpha$-olefins and the unsaturated carboxylic acid in which the carboxylic acid groups are randomly distributed over all molecules and in which (1) the $\alpha$-olefin content of the copolymer is at least 50 mol percent, based on the $\alpha$-olefin-acid copolymer, (2) the unsaturated carboxylic acid content of the copolymer is from 0.2 to 25 mol percent, based on the $\alpha$-olefin-acid copolymer, and (3) any other monomer component optionally copolymerized in said copolymer is monoethylenically unsaturated, and said metal ions having an ionized valence of from 1 to 3 inclusive when the unsaturated acid is a monocarboxylic acid and an ionized valence of one when the unsaturated acid is a dicarboxylic acid and said metal ions being selected from the group consisting of uncomplexed and complexed metal ions, and 0.1 to 0.5% by weight, based on the weight of the copolymer, of a hydrophobic aliphatic silane treated silicon dioxide.

Preferred results are obtained when the copolymer is an ionic copolymer having from 10 to 90% by weight of the carboxylic acid groups ionized by neutralization with metal ions, preferably $Na^+$ and $Zn^{+2}$ ions.

DETAILED DESCRIPTION OF THE INVENTION

The dry blend coating material consists essentially of an ionic copolymer or a copolymer or terpolymer base resin of the ionic copolymer and a hydrophobic, aliphatic silane treated, fumed silicon dioxide. The term "consisting essentially of" as used herein, is meant to include in the dry blend only those additional components which do not materially affect the essential characteristics of the dry blend as it relates to this invention. In other words, this term excludes unspecified components in amounts which prevent the advantages of the dry blends of this invention from being realized.

Suitable ionic copolymers or copolymer or terpolymer base resin of the ionic copolymers are described in U.S. Pat. No. 3,264,272; Assignee's U.S. application Ser. No. 280,861, filed Aug. 15, 1972, and Canadian Pat. No. 655,298, the disclosures of which are incorporated by reference. The polymers are in the form of particles which form 100 mesh or finer powder. Preferably the particles which make up the powder are in the form of spherical-shaped particles having an average diameter of 10 to 100 microns and are characterized by having a surface that is rough and is covered with hemispherical-shaped bumps about 0.1 micron in diameter at the base. The unique, spherical-shaped particles can be prepared by a method described in Assignee's Gebhard, Waggoner and Webster application, U.S. Ser. No. 419,894, filed Nov. 28, 1973.

Illustrative of polymers are ionic copolymers of $\alpha$-olefins of the formula $R-CH=CH_2$, where R is hydrogen or an alkyl radical of 1 to 8 carbon atoms; and $\alpha,\beta$-ethylenically unsaturated carboxylic acids having from 3 to 8 carbon atoms, and, optionally, a monoethylenically unsaturated monomer. Suitable olefins include, ethylene, propylene, butene-1, pentene-1, hexene-1, heptene-1, 3-methylbutene-1, 4-methylpentene-1, etc. Ethylene is the preferred olefin. Although polymers of olefins having higher carbon numbers can be employed in the present invention, they are not materials which are readily obtained or available. The concentration of the $\alpha$-olefin is at least 50 mol percent in the copolymer and is preferably greater than 80 mol percent. Examples of $\alpha,\beta$-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other $\alpha,\beta$-monoethylenically unsaturated anhydrides of carboxylic acids can be employed. The preferred unsaturated carboxylic acids are methacrylic and acrylic acids. As indicated, the concentration of acidic monomer in the copolymer is from 0.2 mol percent to 25 mol percent, and, preferably, from 1 to 10 mol percent.

The copolymer base need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below in this and the following paragraph, can be employed in combination with the olefin and the carboxylic acid comonomer. The scope of base copolymers suitable for use in the present invention is illustrated by the following two component examples: ethylene/acrylic acid copolymers, ethylene/methacrylic acid copolymers, ethylene/itaconic acid copolymers, ethylene/methyl hydrogen maleate copolymers, and ethylene/maleic acid copolymers, etc. Examples of tricomponent copolymers include: ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

In addition to the third components of the ionic copolymer stated above, additional third monomeric components can be an alkyl ester of an $\alpha,\beta$-ethylenically unsaturated carboxylic acid of 3–8 carbon atoms where the alkyl radical has 4–18 carbon atoms. Particularly preferred are the terpolymers obtained from the copolymerization of ethylene, methacrylic acid and alkyl esters of methacrylic acid or acrylic acid with butanol. The concentration of this optional component is 0.2–25 mol percent, based on the weight of copolymer, preferably from 1–10 mol percent. Representative examples of the third component include n-butyl acrylate, isobutyl acrylate, secondary butyl acrylate, tertiary butyl acrylate, n-butyl methacrylate, isobutyl methacrylate, secbutyl methacrylate, t-butyl methacrylate, n-pentyl acrylate, n-pentyl methacrylate, isopentyl acrylate, isopentyl methacrylate, n-hexyl acrylate, n-hexyl methacrylate, 2-ethylhexyl acrylate, 2-ethylhexyl methacrylate, stearyl acrylate, stearyl methacrylate, n-butyl ethacrylate, 2-ethyl hexyl ethacrylate. Also, the third component includes mono- and di-esters of 4–8 carbon atom dicarboxylic acids such as n-butyl hydrogen maleate, sec-butyl hydrogen maleate, isobutyl hydrogen maleate, t-butyl hydrogen maleate, 2-ethyl hexyl hydrogen maleate, stearyl hydrogen maleate, n-butyl hydrogen fumarate, sec-butyl hydrogen fumarate, isobutyl hydrogen fumarate, t-butyl hydrogen fumarate, 2-ethyl hexyl hydrogen fumarate, stearyl hydrogen fumarate, n-butyl fumarate, sec-butyl fumarate, isobutyl fumarate, t-butyl fumarate, 2-ethyl hexyl fumarate, stearyl fumarate, n-butyl maleate, sec-butyl maleate, isobutyl maleate, t-butyl maleate, 2-ethyl hexyl maleate, stearyl maleate. The preferred alkyl esters contain alkyl groups of 4–8 carbon atoms. The most preferred contain 4 carbon atoms. Representative examples of the most preferred esters are n-butyl acrylate, isobutyl acrylate, butyl methacrylate, isobutyl methacrylate, tertiary butyl acrylate, tertiary butyl methacrylate.

The copolymers may also, after polymerization but prior to ionic cross-linking, be further modified by various reactions to result in polymer modifications which do not interfere with the ionic cross-linking. Halogenation of an olefin acid copolymer is an example of such polymer modification.

The preferred base copolymers, however, are those obtained by the direct copolymerization of ethylene with a monocarboxylic acid comonomer.

Metal ions which are suitable in forming the ionic copolymers of the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me^{+n}X_m$, where n is the ionic charge and is at least one, X is a nonionized groups and $n+m$ equal the valence of the metal. The utility of complexed metal ions employed in the formation of ionic copolymers corresponds in their ionized valences to those of the uncomplexed metal ions. The monovalent metals are, of course, excluded from the class of complexed metal ions, but higher-valent metals may be included depending on how many metal valences are complexed and how many can be ionized. The preferred complexed metal ions are those in which all but one metal valences are complexed and one is readily ionized. Such compounds are in particular the mixed salts of very weak acids, such as oleic and stearic acid, with ionizable acids, such as formic and acetic acid.

The uncomplexed metal ions which are suitable in forming the ionic copolymers of the present invention, therefore comprise for the $\alpha$-olefin-monocarboxylic acid copolymers, mono-, di- and trivalent ions of metals in Groups I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metals, regardless of the nature of the base copolymer are $Na^+$ and $Zn^{+2}$. These metals are preferred because they result in ionic copolymers having the best combination of improvement in solid-state properties with retention of melt fabricability. It is not essential that only one metal ion be employed in the formation of the ionic copolymers and more than one metal ion may be preferred in certain applications.

The melt index of the polymer ranges from 0.1 g./10 min. to 500 g./10 min., preferably 4–50 g./10 min.

The useful hydrophobic, aliphatic silane-treated fumed silicon dioxides are commercially available compounds sold under trade names "Silanox" 101 and "Aerosil" R972 by Cabot Corporation, Boston, Mass., and Degussa, Inc., Hanan, Germany. The compounds are reaction products of fumed silicon dioxide and an aliphatic silane. A silicon compound, e.g., $SiCl_4$, is fumed in a combustible gas, e.g., propane, to form a nonporous silica particle. This, in turn, is reacted with a silane compound. The literature describes the silane-treated surface of the silica particles by the following formula:

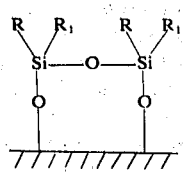

where R and $R_1$ are alkyl groups of 1-4 carbon atoms, preferably methyl. The compounds are dry-blended with the copolymer in an amount of 0.1-0.5% or more, preferably 0.1-0.3% by weight, based on the weight of the copolymer. Excessive hydrophobic silicon dioxide in the powder above 0.5% by weight causes coatings to become hazy but does not change the coating functionality. The dry blends can be made using standard mixing devices known to those skilled in the art.

The dry blend is applied to glass surfaces, e.g., bottles, plates, etc., by dry spraying followed by fusing with heat such as infrared or other heating source. The coatings are generally in the range of 3-10 mils, preferably 4-6 mils. The coatings of this invention retain indefinitely, after 24-48 hours conditioning, approximately 90-100% by weight of the glass particles when the glass is broken.

The dry blends, as indicated previously, are useful in coating surfaces, particularly glass. The coatings containing the hydrophobic, aliphatic silane-treated, fumed silicon dioxide significantly decrease the aging time required for the coatings to achieve the best cullet retention from 2-3 weeks to about 48 hours or less. The result is that it will be possible for bottlers to reduce inventory and to reduce the warehousing problems associated with aging coated glass bottles.

EXAMPLES OF THE INVENTION

The following Examples further illustrate the invention. All percentages are by weight unless otherwise indicated. The drop test used in the examples was performed as follows: The coated bottles were filled with dilute $H_2SO_4$, gelatin capsules containing sodium carbonate were added, and the bottles were capped. When the gelatin capsules dissolved, the $H_2SO_4/Na_2CO_3$ reaction generated an internal pressure in the bottles of about 60 psig. The bottles were then dropped 4 feet on their sides (horizontal position) onto a steel plate. The fragments leaving the glass envelope were weighed and subtracted from the initial weight of glass in the bottle. The ratio of glass retained in the plastic to initial glass weight × 100% equals percent cullet retention or percentage of glass retained by the polymer coating.

EXAMPLE 1

Glass microscope slides were sprinkled with an ionic copolymer powder by vibrating over each slide a 100 mesh screen containing a small quantity of powder. The ionic copolymer powder was prepared as described in Example 1 of Assignee's copending United States application U.S. Ser. No. 419,894, filed Nov. 28, 1973. Utilizing 340 ml./min. water, 34 ml./min. 15% solution of $NH_4OH$ and 50 g./min. ethylene/methacrylic acid copolymer base resin containing 11% methacrylic acid (melt index 100) in a continuous process. The base resin was partially neutralized with a 2.5% NaOH solution at 30 ml./min. The ionic copolymer particles had a melt index of 20.4 g./10 min. as determined by ASTM D-1238, Condition E, and a percent fluidization =

$$\frac{\text{packed density}}{\text{density in fluidized state}} \times 100\%$$

of 206% at a fluidizing gas velocity of 1.3 cm./sec. and a packed density of 35 lb./ft.$^3$. The individual particles had on their surface hemispherical-shaped bumps about 0.1 micron in diameter at the base. The powder was melted using an infrared heat source to form continuous 4-6 mil coatings on the glass. Each coating was allowed to cool to room temperature. After 48 hours aging at 24°C., the coatings had high adhesion to the glass and could not be peeled from the glass without rupturing the polymer coating.

A blended sample of the ionic copolymer described above was prepared by blending with the copolymer 0.2% Cabosil, a fumed hydrophilic $SiO_2$ sold by Cabot Corporation, Boston, Mass. The blended sample was used to coat glass slides as described in the first paragraph of this Example with about a 4 to 6 mil thick polymer coating. After 72 hours aging at 24°C. the coatings had high adhesion to the glass and could not be peeled from the glass without rupturing the polymer coating.

A blended sample of the ionic copolymer described above was prepared by blending with the copolymer 0.2% Silanox 101 hydrophobic fumed silica treated with an aliphatic silane sold by Cabot Corporation, Boston, Mass. The blended sample was used to coat glass slides as described in the first paragraph of this Example with about a 4 to 6 mil thick polymer coating. After aging for 30 minutes at 24°C., the coatings were peeled from the surface of the glass slide.

EXAMPLE 2

An ionic copolymer powder prepared as described in the first paragraph of Example 1 was sprayed onto glass beverage bottles and fused by infrared heat to produce clear coatings on the bottles of 4-5 mils in thickness. The coating could not be peeled from the glass after greater than 48 hours aging and gave 60-70% retention of the glass fragments during drop tests.

An ionic copolymer powder as described above was dry blended with 0.2% of Silanox 101 of the third paragraph of Example 1, sprayed onto glass beverage bottles and fused by heat to produce 4 to 5 mil thick coatings on the glass. After aging for 24 hours at 24°C. the coated bottles were drop tested. 90 to 100 Percent of the glass fragments were retained by the coating.

Glass beverage bottles were coated with an ionic copolymer powder as described above dry blended with 0.1% of Silanox 101. Upon drop testing after aging for 24 hours at 24°C., 84% retention of the broken glass was achieved. After 48 hours the glass retention was 90 to 100%.

EXAMPLE 3

A polymeric powder was prepared as described in Example 1 except that there was no neutralization conducted. The powder was dry blended with 0.25% Silanox 101. The blended sample was used to coat glass slides as described in Example 1. After aging for 1 hour at 24°C. the coatings were peeled from the glass using a force of about 1000 to 1500 g./inch.

A similar polymeric powder without the above additive was used to coat glass slides as described above. After aging for 72 hours at 24°C. the coatings had high adhesion to the glass and could not be peeled from the glass without rupturing the polymer coating.

EXAMPLE 4

A polymeric powder was prepared as described in Example 1. The powder was dry-blended with 0.25% Aerosil R 972, a hydrophobic fumed silicon dioxide sold by Degussa, Inc., Hanan, Germany. The blended sample was used to coat glass slides as described in Example 1. After aging for 3 hours at 24°C., the coatings could be peeled from the glass.

I claim:

1. A dry blend coating material for glass which consists essentially of a copolymer of $\alpha$-olefins of the formula $R—CH=CH_2$, where R is a radical selected from the class consisting of hydrogen and alkyl radicals having from 1 to 8 carbon atoms, and $\alpha,\beta$-ethylenically unsaturated carboxylic acids having from 3 to 8 carbon atoms, said copolymer having from 0 to 90% of the carboxylic acid groups ionized by neutralization with metal ions, said copolymer being a copolymer of the $\alpha$-olefins and the unsaturated carboxylic acid in which the carboxylic acid groups are randomly distributed over all molecules and in which
   1. the $\alpha$-olefin content of the copolymer is at least 50 mol percent, based on the $\alpha$-olefin-acid copolymer,
   2. the unsaturated carboxylic acid content of the copolymer is from 0.2 to 25 mol percent, based on the $\alpha$-olefin-acid copolymer, and
   3. any other monomer component merized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, and 0.1 to 0.5% by weight, based on the weight of the copolymer, of a hydrophobic, aliphatic silane-treated, fumed silicon dioxide prepared by treating $SiCl_4$ in a combustible gas to form nonporous silica particles and contacting said particles with a silane compound to yield a silane-treated surface on the silica particles.

2. A coating material according to claim 1 wherein the copolymer is an ionic copolymer having from 10 to 90% of the carboxylic acid groups ionized by neutralization with metal ions.

3. A coating material according to claim 2 wherein the metal ions are taken from the group consisting of $Na^+$ and $Zn^{+2}$.

4. A coating material according to claim 2 wherein the copolymer is an ethylene/methacrylic acid ionic copolymer.

5. A coating material according to claim 1 wherein the copolymer is a copolymer base resin.

6. A coating material according to claim 5 wherein the copolymer base resin is ethylene/methacrylic acid.

7. A coating material according to claim 1 wherein the copolymer is a terpolymer base resin.

8. A coating material according to claim 7 wherein the terpolymer base resin is ethylene/methacrylic acid/isabutyl acrylate.

9. A coating material according to claim 1 wherein the silane-treated surface on the silica particles is represented by the formula:

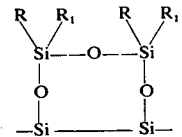

where R and $R_1$ are alkyl groups of 1 to 4 carbon atoms.

* * * * *

UNITED STATES PATENT OFFICE
CERTIFICATE OF CORRECTION

PATENT NO. : 3,909,487
DATED : September 30, 1975
INVENTOR(S) : Marion Glen Waggoner It is certified that error appears in the above-identified patent and that said Letters Patent are hereby corrected as shown below:

Column 3, line 39, "secbutyl" should be -- sec-butyl --.

Column 7, line 39, "merized" should be -- optionally copolymerized --.

Column 8, line 29, "/isabutyl" should be -- /isobutyl --.

Signed and Sealed this thirteenth Day of January 1976

[SEAL]

Attest:

RUTH C. MASON
*Attesting Officer*

C. MARSHALL DANN
*Commissioner of Patents and Trademarks*